United States Patent
Xie et al.

(10) Patent No.: US 6,846,105 B2
(45) Date of Patent: Jan. 25, 2005

(54) METHOD FOR CONTINUOUSLY MEASURING MELTING STEEL TEMPERATURE AND MEASURING TEMPERATURE PIPE

(75) Inventors: Zhi Xie, Shenyang (CN); Rujun Chen, Shenyang (CN); Hongji Meng, Shenyang (CN)

(73) Assignees: Northeastern University, Shenyang (CN); Shenyang Taihe Instrumentation Co., Ltd., Shenyang (CN)

( * ) Notice: Subject to any disclaimer, the term of this patent is extended or adjusted under 35 U.S.C. 154(b) by 0 days.

(21) Appl. No.: 10/332,747
(22) PCT Filed: Jul. 12, 2001
(86) PCT No.: PCT/CN01/01171
§ 371 (c)(1),
(2), (4) Date: Jul. 24, 2003
(87) PCT Pub. No.: WO02/10700
PCT Pub. Date: Feb. 7, 2002

(65) Prior Publication Data
US 2004/0047395 A1 Mar. 11, 2004

(30) Foreign Application Priority Data
Jul. 12, 2000 (CN) .......................................... 00120354 A

(51) Int. Cl.[7] .............................. G01K 1/08; G01K 1/20; G01K 7/02; H01L 35/02
(52) U.S. Cl. ............................ 374/139; 374/208; 374/2; 374/179; 136/234
(58) Field of Search ................................ 374/139, 179, 374/208, 141, 2; 136/234, 230, 232

(56) References Cited

U.S. PATENT DOCUMENTS 3,308,666 A * 3/1967 Anderson et al. ............. 338/28
3,647,559 A * 3/1972 Truppe et al. ............... 136/234

(List continued on next page.)

FOREIGN PATENT DOCUMENTS

| CN | 94119853.7 | 11/1994 | |
|---|---|---|---|
| CN | 95207108.8 | 2/1996 | |
| EP | 0314807 A1 * | 12/1988 | ........... C04B/35/58 |
| JP | 8-320263 | 12/1996 | |

OTHER PUBLICATIONS

International Search Report, International App. No. PCT/CN01/01171.

*Primary Examiner*—Gail Verbitsky
(74) *Attorney, Agent, or Firm*—Harness, Dickey & Pierce, P.L.C.

(57) ABSTRACT

The invention discloses a method for measuring the temperature of a molten steel continuously, comprises the following steps: providing a tube that is made of double bushings, both of the inner and outer bushings being close at one end and open at another end; putting the close end of the tube into the molten steel in such a way that the ratio of the length of the tube under the surface of the molten steel to the inner diameter of the inner bushing is equal or greater than 15 and the ratio of said length to the outer diameter of the outer bushing is greater than 3; connecting the open end of the tube with an infrared detector; and calculating the temperature of the molten steel through evaluating the radiation emitted by the inner bushing at the end that was put under the molten steel by means of the detector. A tube to implement the method is also disclosed.

13 Claims, 2 Drawing Sheets

U.S. PATENT DOCUMENTS

| | | | |
|---|---|---|---|
| 4,531,844 A | * 7/1985 | Juras | 374/208 |
| 4,576,486 A | 3/1986 | Dils | |
| 4,984,904 A | * 1/1991 | Nakano et al. | 374/139 |
| 5,005,986 A | * 4/1991 | Najjar et al. | 374/179 |
| 5,209,571 A | * 5/1993 | Kendall | 374/139 |
| 5,242,226 A | * 9/1993 | Ross et al. | 374/208 |
| 5,364,186 A | 11/1994 | Wang et al. | |
| 5,388,908 A | * 2/1995 | Kendall | 374/140 |
| 5,520,461 A | * 5/1996 | Curry et al. | 374/179 |
| 5,917,145 A | * 6/1999 | Parent et al. | 136/234 |
| 5,949,000 A | * 9/1999 | Lindholm et al. | 73/864.91 |
| 5,963,580 A | * 10/1999 | Eckert | 373/42 |
| 6,050,723 A | * 4/2000 | Amra | 374/140 |
| 6,139,180 A | * 10/2000 | Usher et al. | 374/1 |
| 6,280,083 B2 | * 8/2001 | Kita et al. | 374/140 |
| 6,447,160 B1 | * 9/2002 | Fraden | 374/2 |
| 2004/0174922 A1 | * 9/2004 | Yamashita et al. | 374/131 |

* cited by examiner

METHOD FOR CONTINUOUSLY MEASURING MELTING STEEL TEMPERATURE AND MEASURING TEMPERATURE PIPE

TECHNICAL FIELD

The present invention relates to a method for measuring the temperature of molten steel continuously and a tube used for implementing said method.

BACKGROUND OF THE INVENTION

In metallurgy, the temperature of molten steel needs to be measured continuously. The steel making process is essentially the process of controlling the temperature and the ingredients of the molten steel, so measuring the temperature of the molten steel continuously is significant for improving productive efficiency, decreasing energy consumption and improving quality. The conventional technique for the measurement works in an object-contacted way. A platinum-rhodium thermo-couple with a protector is put into the molten steel to sense the temperature. However, the protector's lifetime is limited because of the erosion of steel residue and the thermo-couple is expensive, so the cost of measurement is high, which is difficult to be accepted by steel making plants.

U.S. Pat. No. 3,432,522 discloses a device of continuously measuring the temperature of molten steel, utilizing the blackbody cavity theory. According to this patent, a tube is put into the molten steel and the temperature of the molten steel is obtained from the radiation emitted by the tube and received by an infrared detector. However, many disadvantages exist in this patent. Firstly, blackbody cavity is a special physical concept and physical model generating stable spectral irradiation similar with that of the perfect blackbody. The radiant traits of a cavity depend on the structure, the material and other factors of the cavity, therefore, not every cavity can be called as a blackbody cavity. This patent fails to describe the structure of the tube in detail and teach how deeply the tube should be put into the molten steel. Moreover, whether the ceramic portion of the tube should immerge under the surface of the molten steel is not mentioned. Therefore, the tube in this patent should not be called as a blackbody cavity. Consequently, errors will occur in the results of the measurement. Secondly, graphite used at the end of the tube is of strong volatility under high temperature environment, and the volatile gas can pollute the optical path and significantly affect the accuracy of the measurement.

SUMMARY OF THE INVENTION

The object of the invention is to provide a method and a tube for measuring the temperature of molten steel continuously with low cost and high precision.

According to the invention, the method for measuring the temperature of molten steel continuously comprises the following steps: providing a tube that is made of double bushings, both of the inner and outer bushings being close at one end and open at another end; putting the close end of the tube into the molten steel in such a way that the ratio of the length of the tube under the surface of the molten steel to the inner diameter of the inner bushing is equal or greater than 15 and the ratio of said length to the outer diameter of the outer bushing is greater than 3; connecting the open end of the tube with an infrared detector; and calculating the temperature of the molten steel through evaluating the radiation emitted by the inner bushing at the end that was put into the molten steel by means of the detector.

To implement the above method, the present invention provides a tube, one end of which is configured to be put into molten steel to sense the temperature and another end of which is configured to be connected with an infrared detector. The tube is made of double bushings, both of the inner and outer bushings being close at one end and open at another end. The close end of the tube is put into the molten steel in such a way that the ratio of the length of the tube under the surface of the molten steel to the inner diameter of the inner bushing is equal or greater than 15 and the ratio of said length to the outer diameter of the outer bushing is greater than 3.

Based on heat transfer analysis and blackbody cavity theory, according to the invention, the structure of the tube and the length of the tube under the surface of the molten steel are specified so that stable radiation of the blackbody cavity can be obtained. Accordingly, the temperature of the molten steel can be measured continuously with low cost and high precision.

DETAILED DESCRIPTION OF THE PREFERRED EMBODIMENTS

Figure 1:
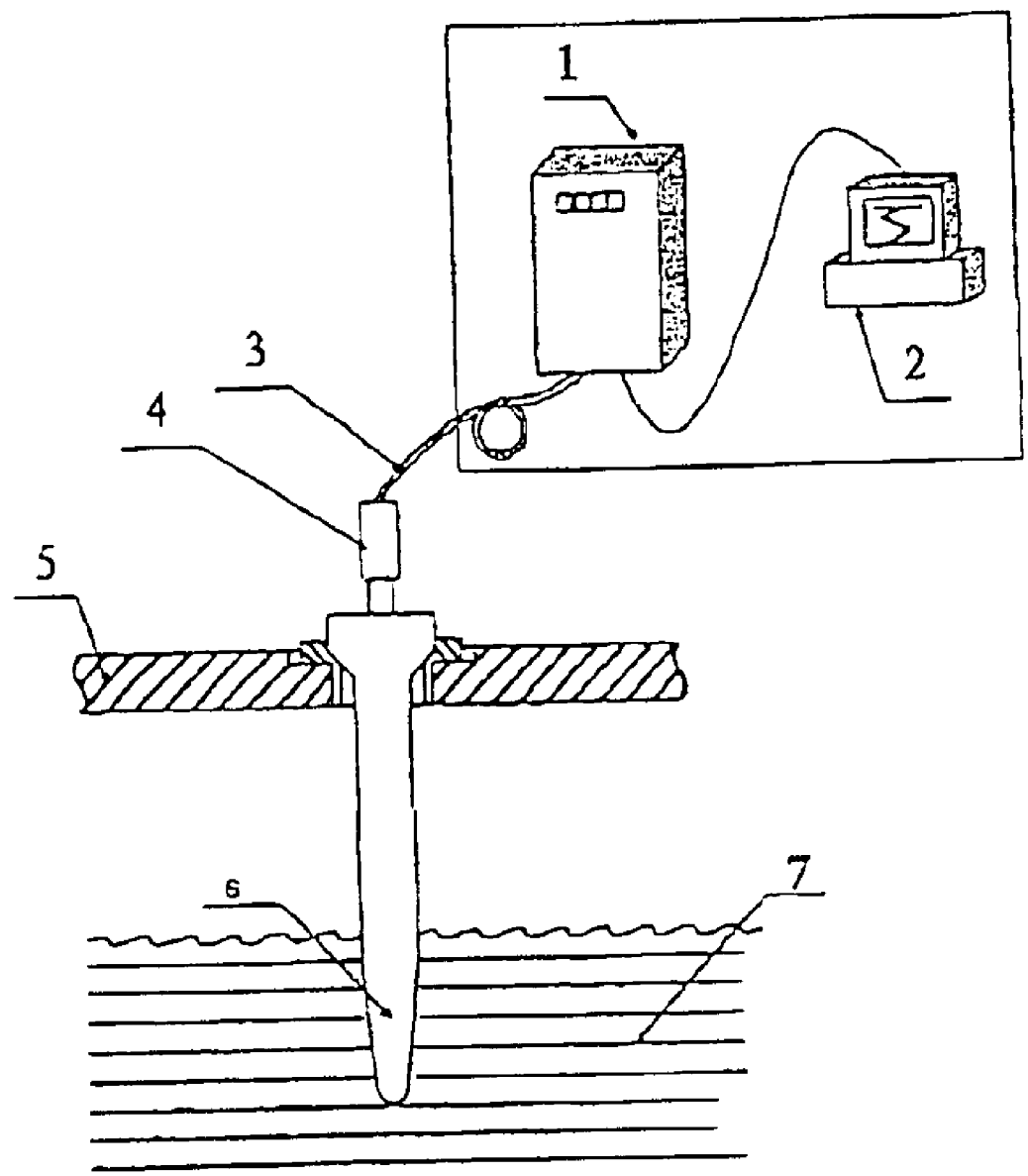
FIG. 1 is a schematic diagram of the device for measuring the temperature of molten steel according to the method of the invention.

As shown in FIG. 1, the device for measuring the temperature of molten steel continuously according to the method of the invention comprises a tube 6, an infrared detector 4, an optical fibre 3, a signal processor 1 and a computer 2. In operation, the tube 6 is fixed to a holder 5 and put into the molten steel 7. There is provided a cone-shaped connector at the open end of the tube 6, in order to connect with the infrared detector 4, in which a corresponding cone-shaped concave is formed to facilitate replacing the tube.

Figure 2:
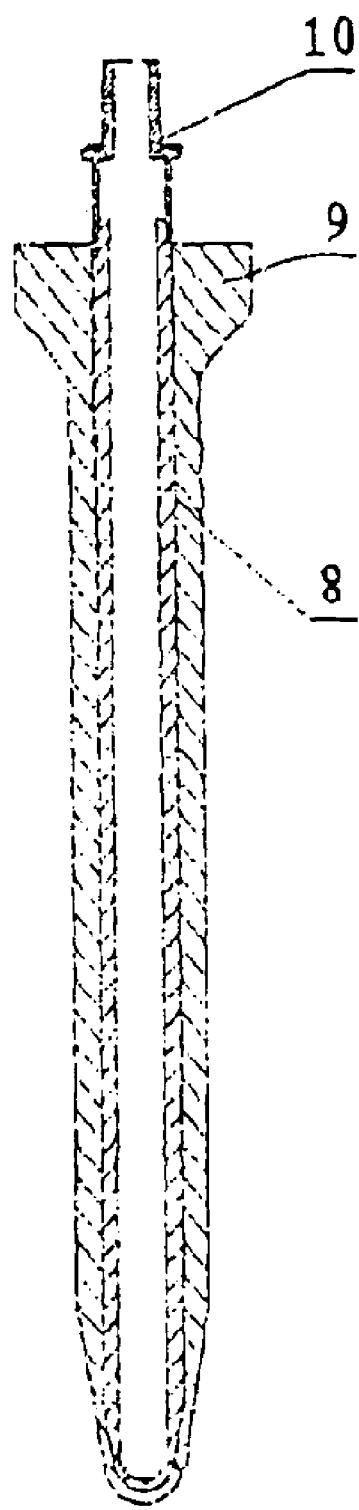
FIG. 2 is a schematic diagram of the tube of the invention.

Considering the tube has to be put into the molten steel, it should be of excellent heat-resistance, molten steel scour-resistance, vibration-resistance, stability and accuracy. Therefore, the tube 6 is made of double bushings, as shown in FIG. 2. Both of the inner bushing 8 and the outer bushing 9 are close at one end and open at another end. The close end of the tube is put into the molten steel 7, and the open end is connected to the infrared detector 4 by a connector 10. The inner bushing 8 is preferably made from material of good heat-resistance and stability, such as $Al_2O_3$, with an inner diameter of, for example, 20 mm. The inner bushing 8 has the traits of good obturation and evaporation-resistance in high temperature environment, which ensure that the optical path within the tube is clean and the measurement results are accurate. The outer bushing 9 is preferably made from material of good heat-resistance, erosion-resistance, oxidation-resistance and molten steel scour-resistance, such as $Al_2O_3$ and C or $Al_2O_3$, C and Zr, with an outer diameter of, for example, 80 mm. Besides, in order to improve the measurement sensitivity, the outer bushing 9 is preferably thicker at the residue surface than at the temperature measuring end. Furthermore, an oxidation-resistant coating can be applied to the outer bushing 9 and a protective bushing can be fixed around it to improve stress intensity.

The process of measuring the temperature of the molten steel is briefly described as follows. Firstly, putting the close end of the tube 6 into the molten steel 7 in such a way that the ratio of the length of the tube under the surface of the molten steel to the inner diameter of the inner bushing is equal or greater than 15 and the ratio of said length to the outer diameter of the outer bushing is greater than 3. A blackbody cavity is thus produced within the tube 6, which emits infrared radiation. The radiation is received by the infrared detector 4. The received signals are transferred to the signal processor 1 and the computer 2 through the optical fibre 3. The computer 2 calculates the effective emissivity of the cavity based on on-line blackbody cavity theory and thus determines the temperature of the molten steel.

The structure of the infrared detector 4 and how to calculate the temperature of the molten steel from the received infrared radiation belong to the prior art, and, therefore, are not described here in detail.

The experimental results show that the measuring error is less than ±3° C.

It is emphasized that the above embodiment should not be understood as a limitation to the protection scope of the invention. In the invention, the key points are that the tube is made of double bushings and the ratios of the length of the tube under the surface of the molten steel to the inner diameter and the outer diameter should satisfy the conditions as set forth above. Any modifications or variations within the spirit of the invention should be within the protection scope of the invention.

What is claimed is:

1. A method for measuring the temperature of molten steel continuously, comprises the following steps:
   providing a temperature measuring tube that is made of an inner bushing as a blackbody cavity radiator and an outer bushing, both of the inner and outer bushings being closed at one end an open at another end;
   putting the closed end of the temperature measuring tube into the molten steel in such a way that the ratio of the length of the temperature measuring tube under the surface of the molten steel to the inner diameter of the inner bushing is equal to or greater than 15 and the ratio of said length to the outer diameter of the outer bushing is greater than 3 so as to form stable blackbody radiation;
   connecting the open end of the temperature measuring tube with an infrared detector system connected to a signal processor; and
   calculating the temperature of the molten steel through evaluating the blackbody radiation emitted by the inner bushing at the end that was put into the molten steel by means of the signal processor.

2. The method according to claim 1, wherein the temperature measuring tube is detachably connected to the detector system through a cone-shaped connector.

3. The method according to claim 1, wherein the inner bushing is made from material of good heat-resistance and stability.

4. The method according to claim 3, wherein the inner bushing is made from $Al_2O_3$.

5. The method according to claim 1, wherein the outer bushing is made from material of good heat-resistance, erosion-resistance, oxidation-resistance and molten steel scour-resistance.

6. The method according to claim 1, wherein the outer bushing is thinner at the temperature measuring end than at the residue surface.

7. The method according to claim 1, wherein the outer bushing is coated with an oxidation-resistant coating.

8. A temperature measuring tube for measuring the temperature of molten steel continuously, the temperature measuring tube comprising one end being configured to be put into the molten steel to sense the temperature and another end being configured to be connected with an infrared detector system connected to a signal processor, the temperature measuring tube being made of an inner bushing as a blackbody cavity radiator and an outer bushing, both of the inner and outer bushings being closed at one end and open at another end, and the closed end of the temperature measuring tube being put into the molten steel in such a way that the ratio of the length of the temperature measuring tube under the surface of the molten steel to the inner diameter of the inner bushing is equal to or greater than 15 and the ratio of said length to the outer diameter of the outer bushing is greater than 3 so as to form stable blackbody radiation.

9. The temperature measuring tube according to claim 8, wherein the inner bushing is made from material of good heat-resistance and stability.

10. The temperature measuring tube according to claim 9, wherein the inner bushing is made from $Al_2O_3$.

11. The temperature measuring tube according to claim 8, wherein the outer bushing is made from material of good heat-resistance, erosion-resistance, oxidation-resistance and molten steel scour-resistance.

12. The temperature measuring tube according to claim 8, wherein the outer bushing is thinner at the temperature measuring end than at the residue surface.

13. The temperature measuring tube according to claim 8, wherein the outer bushing is coated with an oxidation-resistant coating.

* * * * *